United States Patent
Madruga et al.

(10) Patent No.: US 9,501,809 B2
(45) Date of Patent: *Nov. 22, 2016

(54) SYSTEM AND METHOD FOR PHOTOREALISTIC IMAGING WORKLOAD DISTRIBUTION

(71) Applicant: International Business Machines Corporation, Armonk, NY (US)

(72) Inventors: Joaquin Madruga, Round Rock, TX (US); Barry L. Minor, Austin, TX (US); Mark R. Nutter, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,102

(22) Filed: Feb. 21, 2016

(65) Prior Publication Data

US 2016/0171643 A1    Jun. 16, 2016

Related U.S. Application Data

(63) Continuation of application No. 12/329,586, filed on Dec. 6, 2008, now Pat. No. 9,270,783.

(51) Int. Cl.
  *G06T 1/20* (2006.01)
  *G06T 15/00* (2011.01)
  *H04L 29/08* (2006.01)
  *H04L 29/06* (2006.01)

(52) U.S. Cl.
  CPC .............. *G06T 1/20* (2013.01); *G06T 15/005* (2013.01); *H04L 67/1002* (2013.01); *H04L 67/1023* (2013.01); *H04L 67/36* (2013.01); *H04L 67/42* (2013.01); *G06T 2210/52* (2013.01); *G09G 2352/00* (2013.01)

(58) Field of Classification Search
  None
  See application file for complete search history.

(56) References Cited

U.S. PATENT DOCUMENTS

| | | |
|---|---|---|
| 6,028,608 A | 2/2000 | Jenkins |
| 6,057,847 A | 5/2000 | Jenkins |
| 6,192,388 B1 | 2/2001 | Cajolet |
| 6,753,878 B1 | 6/2004 | Heirich et al. |
| 6,816,905 B1 | 11/2004 | Sheets et al. |
| 7,075,541 B2 | 7/2006 | Diard |
| 7,200,219 B1 | 4/2007 | Edwards et al. |
| 7,916,147 B2 | 3/2011 | Clemie et al. |
| 2004/0003022 A1 | 1/2004 | Garrison et al. |
| 2007/0016560 A1 | 1/2007 | Gu et al. |

(Continued)

FOREIGN PATENT DOCUMENTS

| | | |
|---|---|---|
| JP | 2005327146 | 11/2005 |
| JP | 2007200340 | 8/2007 |
| WO | 2008037615 | 4/2008 |

OTHER PUBLICATIONS

Tetsu R. Satoh, "Symplectic ray tracing for simulation of a Hamiltonian system: implementation in parallel computers and evaluation of the calculation cost", IPSJ SIG Technical Report, Japan, vol. 2004, No. 32, pp. 31-36, Mar. 19, 2004.

(Continued)

*Primary Examiner* — Joni Richer
(74) *Attorney, Agent, or Firm* — James L. Baudino

(57) ABSTRACT

A graphics client receives a frame, the frame comprising scene model data. A server load balancing factor is set based on the scene model data. A prospective rendering factor is set based on the scene model data. The frame is partitioned into a plurality of server bands based on the server load balancing factor and the prospective rendering factor. The server bands are distributed to a plurality of compute servers. Processed server bands are received from the compute servers. A processed frame is assembled based on the received processed server bands. The processed frame is transmitted for display to a user as an image.

4 Claims, 6 Drawing Sheets

(56) References Cited

U.S. PATENT DOCUMENTS

| | | |
|---|---|---|
| 2007/0101336 A1 | 5/2007 | Moore et al. |
| 2008/0021987 A1 | 1/2008 | Bates et al. |
| 2008/0114942 A1 | 5/2008 | Brown et al. |

OTHER PUBLICATIONS

Takashi Nishikawa, et al., "Realtime Rendering Application Development using Parallel Processing". Unisys Technology Review, Nihon Unisys, Ltd., vol. 23, No. 4, pp. 125-137, Feb. 29, 2004.

Demarle et al.; Memory-Savvy Distributed Interactive Ray Tracing; Eurographics Symposium on Parallel Graphics and Visualization; 2004.

Cherkasova, L. et al.; Analysis of Enterprise Media Server Workloads: Access patterns, Locality, Content Evolution, and Rates of Change; IEEE/ACM Transactions of Networking; vol. 12, No. 5; Oct. 2004; pp. 781-794.

Rocha, M. et al.; Scalable Media Streaming to Interactive Users; ACM MM; Nov. 2005; pp. 966-975.

Bagrodia, R. et al.; A Scalable Distributed Middleware Service Architecture to Support Mobile Internet Applications; Wireless Networks 9; Jul. 2003; pp. 311-317.

SYSTEM AND METHOD FOR PHOTOREALISTIC IMAGING WORKLOAD DISTRIBUTION

TECHNICAL FIELD

The present invention relates generally to the field of computer networking and parallel processing and, more particularly, to a system and method for improved photorealistic imaging workload distribution.

BACKGROUND OF THE INVENTION

Modern electronic computing systems, such as microprocessor systems, are often configured to divide a computationally-intensive task into discrete sub-tasks. For heterogeneous systems, some systems employ cache-aware task decomposition to improve performance on distributed applications. As technology advances, the gap between fast local caches and large slower memory widens, and caching becomes even more important. Generally, typical modern systems attempt to distribute work across multiple processing elements (PEs) so as to improve cache hit rates and reduce data stall times.

For example, ray tracing, a photorealistic imaging technique, is a computationally expensive algorithm that usually does not have fixed data access patterns. However, ray tracing tasks can nevertheless have a very high spatial and temporal locality. As such, a cache aware task distribution for ray tracing applications can lead to high performance gains.

But typical ray tracing approaches cannot be configured to take full advantage of cache aware task distribution. For example, current ray tracers decompose the rendering problem by breaking up an image into tiles. Typical ray tracers either expressly distribute these tiles among computational units or greedily reserve the tiles for access by the PEs through work stealing.

Both of these approaches suffer from significant disadvantages. In typical express distribution systems, the additional workload required to manage the distribution of tiles inhibits performance. In some cases, this additional workload can mitigate any gains achieved through managed distribution.

In typical work-stealing systems, each PE grabs new tiles after it has processed its prior allotment. But since the PEs grab the tiles from a general pool, the tiles are less likely to have a high spatial locality. Thus, in a work-stealing system, the PEs regularly flush their caches with new scene data and are therefore cold for the next frame, completely failing to take any advantage of the task's spatial locality.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A graphics client receives a frame, the frame comprising scene model data. A server load balancing factor is set based on the scene model data. A prospective rendering factor is set based on the scene model data. The frame is partitioned into a plurality of server bands based on the server load balancing factor and the prospective rendering factor. The server bands are distributed to a plurality of compute servers. Processed server bands are received from the compute servers. A processed frame is assembled based on the received processed server bands. The processed frame is transmitted for display to a user as an image.

In an alternate embodiment, a system comprises a graphics client. The graphics client is configured to receive a frame, the frame comprising scene model data; set a server load balancing factor based on the scene model data; set a prospective rendering factor based on the scene model data; partition the frame into a plurality of server bands based on the server load balancing factor and the prospective rendering factor; distribute the plurality of server bands to a plurality of compute servers; receive processed server bands from the plurality of compute servers; assemble a processed frame based on the received processed server bands; and transmit the processed frame for display to a user as an image.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
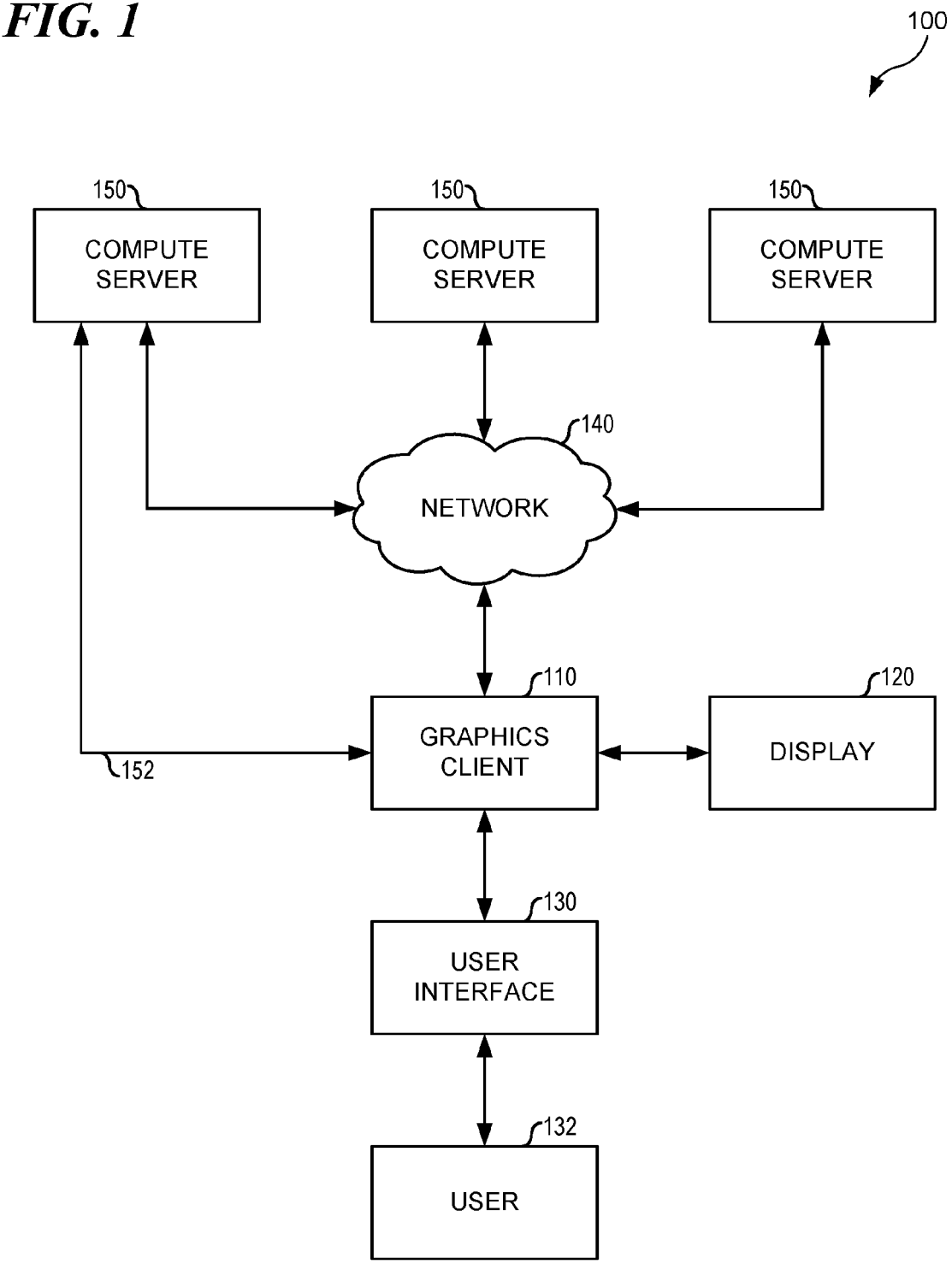
FIG. 1 illustrates a block diagram showing an improved photorealistic imaging system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved photorealistic imaging workload distribution, in accordance with a preferred embodiment of the present invention. System 100 comprises a graphics client 110.

Graphics client 110 is a graphics client module or device, as described in more detail in conjunction with FIG. 2, below. Graphics client 110 couples to display 120. Display 120 is an otherwise conventional display, configured to display digitized graphical images to a user.

Graphics client 110 also couples to a user interface 130. User interface 130 is an otherwise conventional user interface, configured to send information to, and receive information from, a user 132. In one embodiment, graphics client 110 receives user input from user interface 130. In one embodiment, user input comprises a plurality of image frames, each frame comprising scene model data, the scene model data describing objects arranged in an image. In one embodiment, user input also comprises camera movement commands describing perspective (or "eye") movement from one image frame to another.

In the illustrated embodiment, graphics client 110 also couples to network 140. Network 140 is an otherwise conventional network. In one embodiment, network 140 is a gigabit Ethernet network. In an alternate embodiment, network 140 is an Infiniband network.

Network 140 couples to a plurality of compute servers 150. Each compute server 150 is a compute server as described in more detail in conjunction with FIG. 3, below. In the illustrated embodiment, graphics client 110 couples to the compute servers 150 through network 140.

In an alternate embodiment, graphics client 110 couples to one or more computer servers 150 through a direct link 152. In one embodiment, link 152 is a direct physical link. In an alternate embodiment, link 152 is a virtual link, such as a virtual private network (VPN) link, for example.

Generally, in an exemplary operation, described in more detail below, system 100 operates as follows. User 132, through user interface 130, directs graphics client 110 to display a series of images on display 120. Graphics client 110 receives the series of images as a series of digitized image "frames," for example, by retrieving the series of frames from a storage on graphics client 110 or from user interface 130. Generally, each frame comprises scene model data describing elements arranged in a scene.

For each frame, graphics client 110 partitions the frame into a plurality of server bands, each server band associated with a particular compute server 150, based on a server load balancing factor and a prospective rendering factor. Graphics client 110 distributes the server bands to the compute servers 150. Each compute server 150 (comprising a plurality of processing elements (PEs)) divides the received server bands (received as "raw display bands") into PE blocks, each PE block associated with a particular PE, based on a PE load balancing factor. In some embodiments, the compute servers 150 divide the server bands into PE blocks based on the PE load balancing factor and prospective rendering information received from the graphics client 110. The compute servers 150 distribute the PE blocks to their PEs.

The PEs process the PE blocks, rendering the raw frame data and performing the computationally intensive work of turning the raw frame data into a form suitable for the target display 120. In photorealistic imaging processing, rendering can include ray tracing, ambient occlusion, and other techniques. The PEs return the processed PE blocks to their parent compute server 150, which assembles the processed PE blocks into a processed display band.

In some embodiments, the compute servers 150 compress the processed display bands for transmission to graphics client 110. In some embodiments, one or more compute servers 150 transmit the processed display bands without additional compression. Each compute server 150 determines the time each of its PEs took to render its PE block and the total rendering time for the entire raw display band.

The compute servers 150 adjust their PE load balancing factor based on the individual rendering times for each PE. In one embodiment, each compute server 150 also reports its total rendering time to graphics client 110.

Graphics client 110 receives the processed display bands and assembles the bands into a processed frame. Graphics client 110 transmits the processed frame to display 120 for display to the user. In one embodiment, graphics client 110 modifies the load balancing factor based on reported rendering times received from the compute servers 150.

Thus, as described generally above and in more detail below, graphics client 110 distributes unprocessed server bands to compute servers 150 based in part on the relative load between the servers and in part on prospective rendering information received from the user. The compute servers 150 divide the unprocessed server bands into PE blocks based on the relative load between the PE blocks and the prospective rendering information. The PEs process the blocks, which the compute servers 150 combine into processed bands and return to the graphics client 110. Graphics client 110 assembles the received processed bands into a form suitable for display to a user. Both the compute servers 150 and graphics client 110 use rendering times to adjust load balancing factors dynamically.

As such, system 100 can dynamically distribute the workload among the elements performing computationally intensive tasks. As the frame data changes, certain portions of the frame become more computationally intensive than others, and the system can respond by reapportioning the tasks so as to keep the response times roughly equivalent. As one skilled in the art will understand, roughly equivalent response times indicate a balanced load and help to reduce idle time for the PEs/servers.

Figure 2:
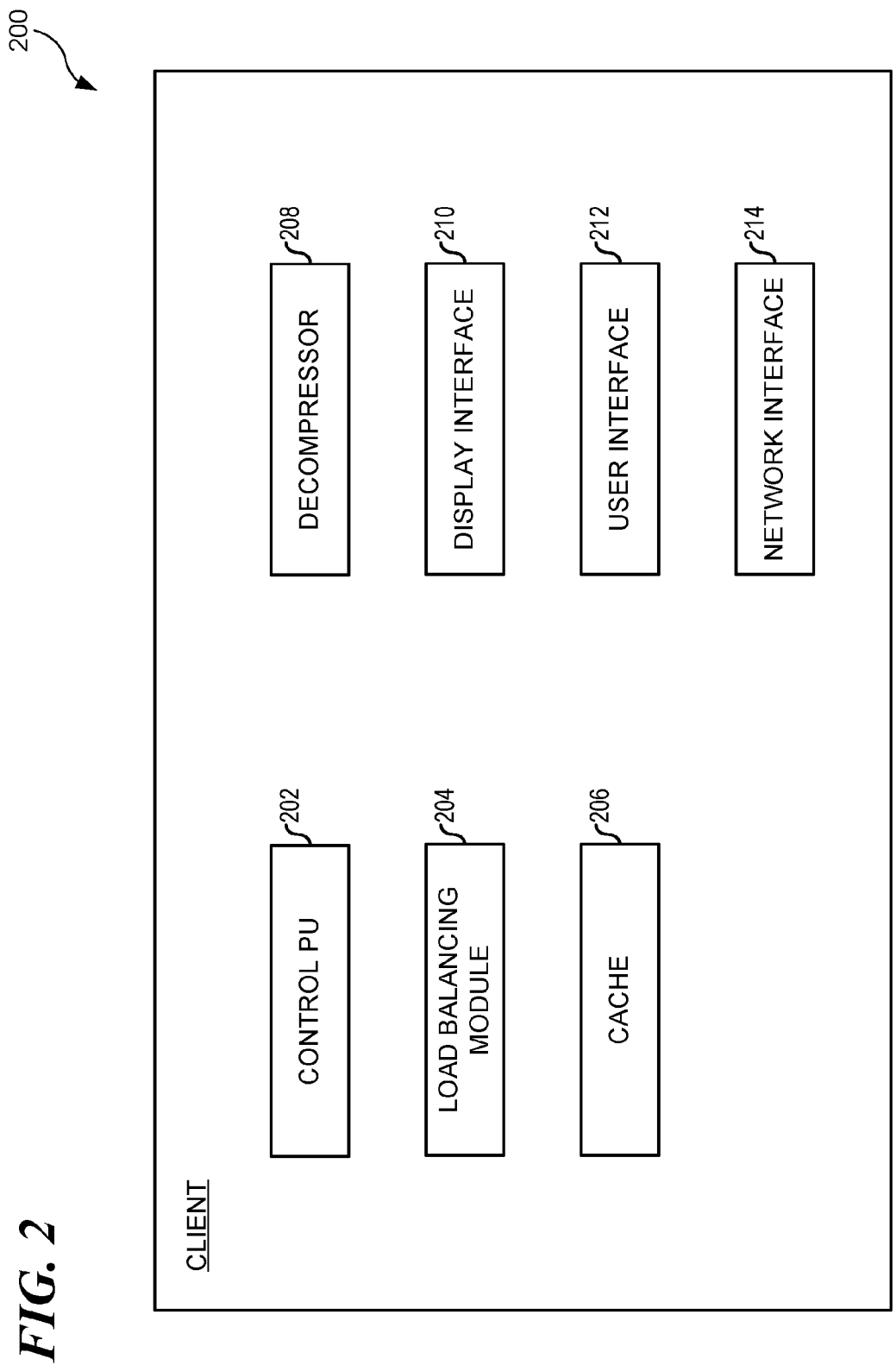
FIG. 2 illustrates a block diagram showing an improved graphics client in accordance with a preferred embodiment.

FIG. 2 is a block diagram illustrating an exemplary graphics client 200 in accordance with one embodiment of the present invention. In particular, client 200 includes control processing unit (PU) 202. Control PU 202 is an otherwise conventional processing unit, configured as described herein. In one embodiment, client 200 is a PlayStation3™ (PS3). In an alternate embodiment, client 200 is an x86 machine. In an alternate embodiment, client 200 is a thin client.

Client 200 also includes load balancing module 204. Generally, control PU 202 and load balancing module 204 partition a graphics image frame into a plurality of bands based on a server load balancing factor and a prospective rendering factor. In particular, in one embodiment, load balancing module 204 is configured to set and modify a server load balancing factor based on server response times and user input. In one embodiment, user input comprises manual server load balancing settings.

In one embodiment, load balancing module 204 divides the frame into bands comprising the frame data, and system 200 transmits the divided frame data to the compute servers for rendering. In an alternate embodiment, client 200 transmits coordinate information demarcating the boundaries of each band in the frame. In one embodiment, the coordinate information comprises coordinates referring to a cached (and commonly accessible) frame.

Load balancing module 204 is also configured to set and modify a prospective rendering factor based on scene model data, user input, and server response times. In one embodiment, user input comprises camera motion information. In one embodiment, camera motion information comprises a perspective, or camera "eye", and a movement vector indicating the speed and direction of a change in perspective.

For example, in one embodiment, client 200 accepts user input including camera motion information and is therefore aware of the direction and speed of the eye's motion. In an alternate embodiment, client 200 accepts user input including tracking information for a human user's eye movement, substituting the human user's eye movement for a camera eye movement. As such, load balancing module 204 can adjust the server band partitioning in advance, based on the expected change in computational load across the frame.

That is, one skilled in the art will understand that certain parts of the frame are more computationally intensive than other parts. For example, a frame segment consisting of only a solid, single-color background is much less computationally intensive than a frame segment containing a disco ball reflecting light from multiple sources. Thus, for example, load balancing module 204 could divide the frame into three bands, one band comprising one-half of the disco ball, and two bands each comprising the entire background and one-quarter of the disco ball.

Further, when the camera eye changes, the scene elements in the frame (e.g., the disco ball) occupy more or less of the frame, in a different location of the frame. In one embodiment, the camera eye movement information includes the direction and velocity of the camera or human eye change, as a "tracking vector." In an alternate embodiment, the camera eye movement information includes a target scene object, upon which the camera eye is focused, and the target scene object's relative distance from the current perspective point. That is, if the system is aware of a specific object that is the focus of the user's attention, a "target scene object," the system can predict that the scene will shift to move that specific object toward the center or near-center of the viewing window. If, for example, the target scene object is located upward and rightward of the current perspective, the camera eye, and therefore the scene, will likely next shift upward and rightward, and the load balancing module can optimize the server band partitioning for that tracking vector.

As such, in one embodiment, load balancing module 204 uses the camera eye movement information and the scene model data to adjust the server band partitioning in advance, which tends to equalize the computational load across the compute servers. In one embodiment, load balancing module 204 uses the tracking vector, target scene object, and relative distance to determine the magnitude of the server band partitioning adjustments. In one embodiment, the magnitude of the server band partitioning adjustments is a measure of the "aggressiveness" of a server band partitioning.

Generally, having partitioned the frame into server bands, client 200 distributes the server bands to their assigned compute servers. Client 200 receives processed display bands from the compute servers in return. In one embodiment, client 200 determines the response time for each compute server. In an alternate embodiment, client 200 receives reported response times from each compute server.

Client 200 also includes cache 206. Cache 206 is an otherwise conventional cache. Generally, client 200 stores processed and unprocessed frames, and other information, in cache 206.

Client 200 also includes decompressor 208. In one embodiment, client 200 receives compressed processed server bands from the compute servers. As such, decompressor 208 is configured to decompress compressed processed server bands.

Client 200 also includes display interface 210, user interface 212, and network interface 214. Display interface 210 is an otherwise conventional display interface, configured to interface with a display, such as display 120 of FIG. 1, for example. User interface 212 is an otherwise conventional user interface, configured, for example, as user interface 130 of FIG. 1. Network interface 214 is an otherwise conventional network interface, configured to interface with a network, such as network 140 of FIG. 1, for example.

Figure 3:
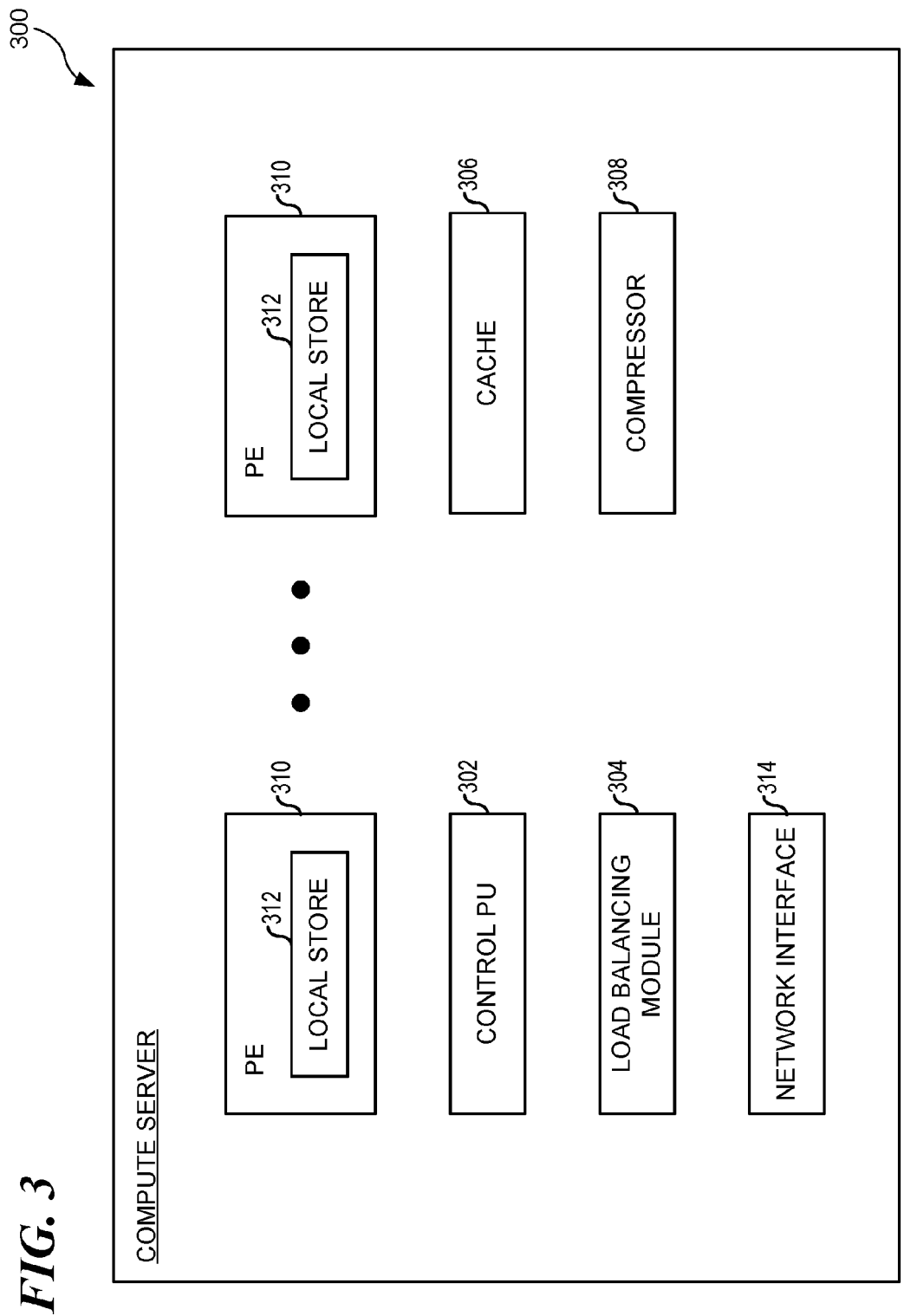
FIG. 3 illustrates a block diagram showing an improved compute server in accordance with a preferred embodiment.

As described above, client 200 is a graphics client, such as graphics client 110 of FIG. 1, for example. Accordingly, client 200 transmits raw server bands to computer servers for rendering and receives processed display bands for display. FIG. 3 illustrates an exemplary compute server in accordance with one embodiment of the present invention.

In particular, FIG. 3 is a block diagram illustrating an exemplary compute server 300 in accordance with one embodiment of the present invention. In particular, server 300 includes control processing unit (PU) 302. As illustrated, control PU 302 is an otherwise conventional processing unit, configured to operate as described below.

Server 300 also includes a plurality of processing elements (PEs) 310. Generally, each PE 310 is an otherwise conventional PE, configured with a local store 312. As described in more detail below, each PE 310 receives a PE block for rendering, renders the PE block, and returns a rendered PE block to the control PU 302.

Server 300 also includes load balancing module 304. Generally, control PU 302 and load balancing module 304 partition a received raw display band into a plurality of PE blocks based on a PE load balancing factor. In particular, in one embodiment, load balancing module 304 is configured to set and modify a PE load balancing factor based on PE response times. In an alternate embodiment, the PE load balancing factor includes a prospective rending factor, and load balancing module 304 is configured to modify the PE load balancing factor based on PE response times and user input.

In one embodiment, load balancing module 304 divides the received raw display band into PE blocks comprising the frame data and control PU 302 transmits the divided frame data to the PEs for rendering. In an alternate embodiment, control PU 302 transmits coordinate information demarcating the boundaries of each PE block. In one embodiment, the coordinate information comprises coordinates referring to a cached (and commonly accessible) frame.

Generally, having partitioned the raw display bands into PE blocks, server 300 distributes the PE blocks their assigned PEs. The PEs 310 render their received PE blocks and return rendered PE blocks to control PU 302. In one embodiment, each PE 310 stores a rendered PE block in cache 306 and indicates to control PU 302 that the PE has completed rendering its PE block.

As such, server 300 also includes cache 306. Cache 306 is an otherwise conventional cache. Generally, server 300 stores processed and unprocessed bands, PE blocks, and other information, in cache 306.

Server 300 also includes compressor 308. In one embodiment, the graphics client receives compressed processed server bands from the compute servers. As such, compressor 308 is configured to compress processed display bands for transmission to the graphics client.

Server 300 also includes network interface 314. Network interface 314 is an otherwise conventional network interface, configured to interface with a network, such as network 140 of FIG. 1, for example.

Generally, server 300 receives raw display bands from a graphics client. Control PU 302 and load balancing module 304 divide the received display band into PE blocks based on a PE load balancing factor. The PEs 310 render their assigned blocks and control PU 302 assembles the rendered PE blocks into a processed display band. Compressor 308 compresses the processed display band and server 300 transmits the processed display band to the graphics client.

In one embodiment, control PU 302 adjusts the PE load balancing factor based on the rendering times for each PE 310. In one embodiment, control PU 302 also determines a total rendering time for the entire display band and reports the total rendering time to the graphics client. Thus, generally, server 300 can modify the PE load balancing factor to adapt to changing loads on the PEs.

Thus, server 300 can balance the rendering load between the PEs, which in turn helps improve (minimize) response time. The operation of the graphics client and the compute server are described in additional detail below. More particularly, the operation of an exemplary graphics client is described with respect to FIG. 4, and the operation of an exemplary compute server is described with respect to FIG. 5.

Figure 4:
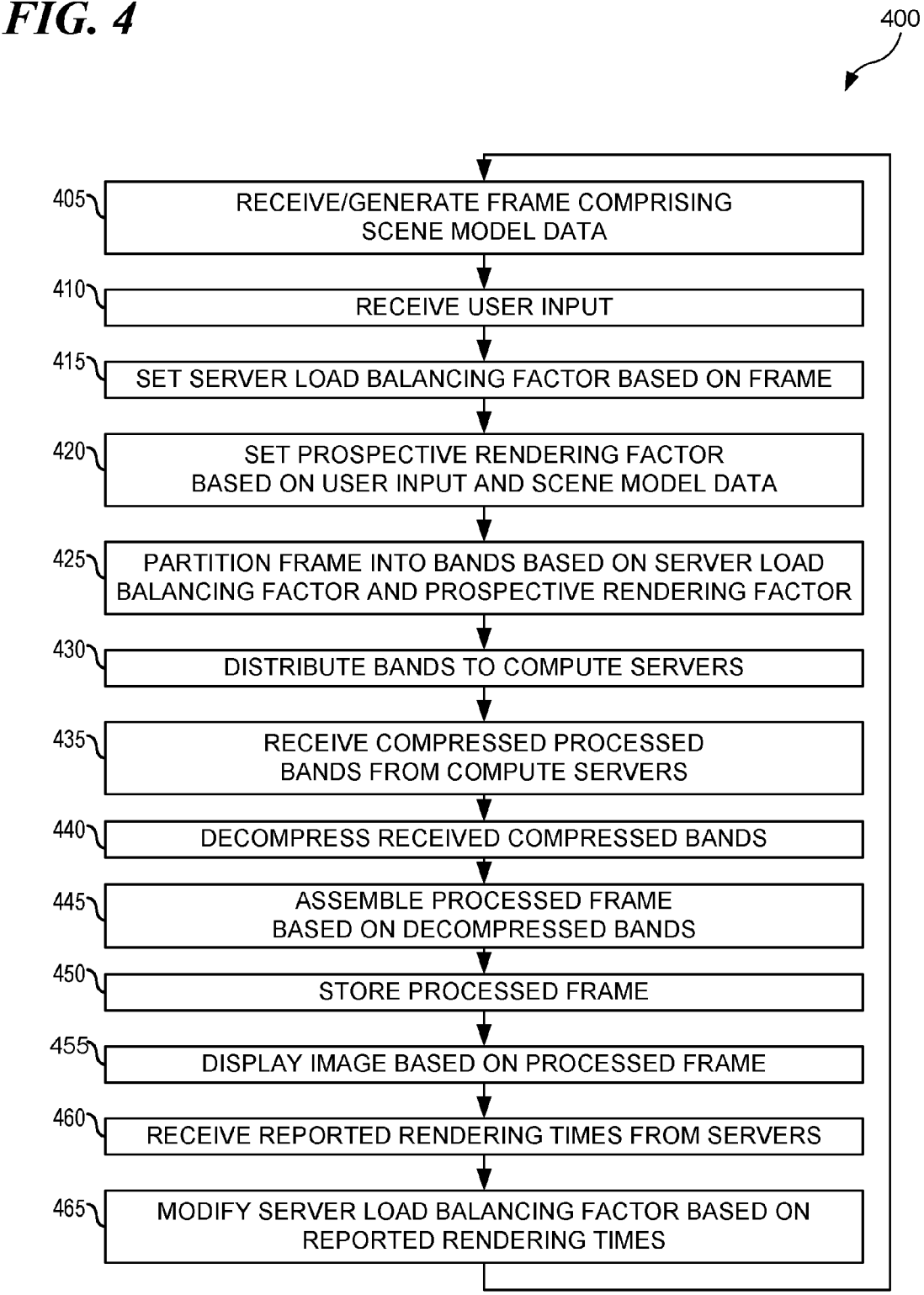
FIG. 4 illustrates a high-level flow diagram depicting logical operational steps of an improved photorealistic imaging workload distribution method, which can be implemented in accordance with a preferred embodiment.

FIG. 4 illustrates one embodiment of a method for photorealistic imaging workload distribution. Specifically, FIG. 4 illustrates a high-level flow chart 400 that depicts logical operational steps performed by, for example, system 200 of FIG. 2, which may be implemented in accordance with a preferred embodiment. Generally, control PU 202 performs the steps of the method, unless indicated otherwise.

As indicated at block 405, the process begins, wherein system 200 receives a digital graphic image frame comprising scene model data for display. For example, system 200 can receive a frame from a user or other input. Next, as illustrated at block 410, system 200 receives user input. As described above, in one embodiment, user input includes camera movement information.

Next, as illustrated at block 415, system 200 sets or modifies a server load balancing factor based on the received frame. Next, as illustrated at block 420, system 200 sets or modifies a prospective rendering factor based on received user input and scene model data. Next, as illustrated at block 425, system 200 partitions the frame into server bands based on the server load balancing factor and the prospective rendering factor.

Based on the user input and the prospective rendering factor, system 200 is aware of the direction and speed of the camera eye's motion. As such, system 200 can pre-adjust the server workload without having to rely exclusively on reactive adjustments. For example, if the user "looks" up or down (moving the camera eye vertically), system 200 can decrease the size of the regions of the compute server on the leading edge to account for the new model geometry that is about to be introduced into the scene.

Moreover, system 200 can adjust how aggressively to rebalance the workload based on the speed of the eye motion. If the camera eye is moving more quickly, system 200 can adjust the workload more aggressively. If the camera eye is moving more slowly, system 200 can adjust the workload less aggressively.

Additionally, system 200 can tailor workload rebalancing according to the type of eye movement demonstrated by the user input. That is, certain types of eye movement respond best to different adjustment patterns. For example, zooming in or moving along the eye vector leads to less of an imbalance across compute servers. As such, system 200 can adjust the workload less aggressively in response to a rapid zoom function, for example, than in response to a rapid pan function.

In one embodiment, system 200 partitions the frame into horizontal server bands. In an alternate embodiment, system 200 partitions the frame into vertical server bands. In an alternate embodiment, system 200 partitions the frame into horizontal or vertical server bands, depending on which alignment yields the more effective (load balancing) partitioning.

Next, as illustrated at block 430, system 200 distributes the server bands to compute servers. Next, as illustrated at block 435, system 200 receives compressed processed display bands from the compute servers. Next, as illustrated at block 440, system 200 decompresses the received compressed processed display bands.

Next, as illustrated at block 445, system 200 assembles a processed frame based on the processed display bands. Next, as illustrated at block 450, system 200 stores the processed frame. Next, as illustrated at block 455, system 200 displays an image based on the processed frame. As described above, in one embodiment, system 200 transmits the processed frame to a display module for display.

Next, as illustrated at block 460, system 200 receives reported rendering times from the compute servers. Next, as illustrated at block 465, system 200 modifies the server load balancing based on the reported rendering times. The process returns to block 405, wherein the graphics client receives a frame for processing.

Figure 5:
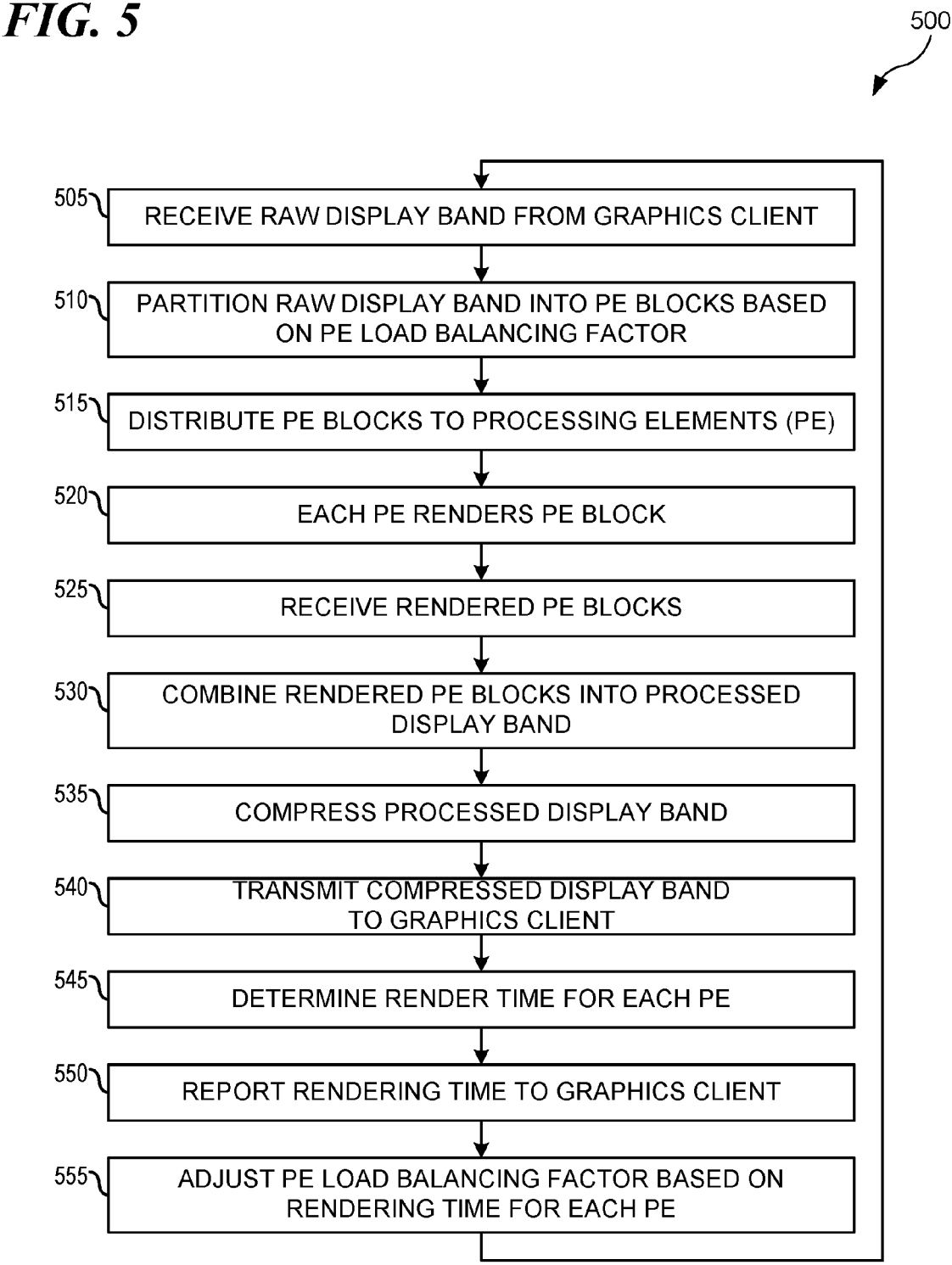
FIG. 5 illustrates a high-level flow diagram depicting logical operational steps of an improved photorealistic imaging workload distribution method, which can be implemented in accordance with a preferred embodiment.

FIG. 5 illustrates one embodiment of a method for photorealistic imaging workload distribution. Specifically, FIG. 5 illustrates a high-level flow chart 500 that depicts logical operational steps performed by, for example, system 300 of FIG. 3, which may be implemented in accordance with a preferred embodiment. Generally, compute PU 302 performs the steps of the method, unless indicated otherwise.

As illustrated at block 505, the process begins, wherein a compute server receives a raw display band from a graphics client. For example, system 300 of FIG. 3 receives a raw display band from a graphics client 200 of FIG. 2. Next, as illustrated at block 510, system 300 partitions the raw display band into PE blocks based on a PE load balancing factor.

In one embodiment, the raw display band includes camera movement information and system 300 partitions the raw display band into PE blocks based on a PE load balancing factor and the camera movement information. In one embodiment, system 300 partitions the raw display band in a similar fashion as does system 200 as described with respect to block 425, above. Accordingly, system 300 can dynamically partition the raw display band to account for prospective changes in the composition of the frame image, helping to maintain load balance between the PEs.

Next, as illustrated at block 515, system 300 distributes the PE blocks to the processing elements. For example, control PU 302 distributes the PE blocks to one or more PEs 310. Next, as illustrated at block 520, each PE renders its received PE block. For example, the PEs 310 render their received PE blocks.

Next, as illustrated at block 525, control PU 302 receives the rendered PE blocks from the PEs 310. As described above, in one embodiment, control PU 302 receives a notification from the PEs 310 that the rendered blocks are available in cache 306. Next, as illustrated at block 530, system 300 combines the rendered PE blocks into a processed display band.

Next, as illustrated at block 535, system 300 compresses the processed display band for transmission to the graphics client. For example, compressor 308 compresses the processed display band for transmission to the graphics client. Next, as illustrated at block 540, system 300 transmits the compressed display band to the graphics client.

Next, as illustrated at block 545, system 300 determines a render time for each PE. For example, control PU 302 determines a render time for each PE 310. Next, as illustrated at block 545, system 300 reports the rendering time to the graphics client. In one embodiment, system 300 calculates the total rendering time for the processed display band, based on the slowest PE, and reports the total rendering time to the graphics client. In an alternate embodiment, system 300 reports the rendering time for each PE to the graphics client.

Next, as illustrated at block 555, system 300 adjusts the PE load balancing factor based on the rendering time for each PE. As described above, system 300 can set the PE load balancing factor to divide the workload among the PEs such that each PE takes approximately the same amount of time to complete its rendering task.

Accordingly, the disclosed embodiments provide numerous advantages over other methods and systems. For example, the disclosed embodiments improve balanced workload distribution over current approaches, especially work-stealing systems. Because the disclosed embodiments better distribute the computational workload, work-stealing is unnecessary, and the computational units can retain relevant cache data without also incurring the penalties inherent in re-tasking a processing element under common work-stealing schema.

More specifically, the disclosed embodiments provide the balance of photorealistic imaging workload distribution, especially in ray tracing applications. By actively managing the computationally intensive regions of a frame, and stalling the computational units waiting for the next frame, the rendering system spends less time stalled for data.

Further, the disclosed embodiments offer methods that maintain focus of a computational unit on a particular region, even as that region is expanded or reduced to maintain relative workload. As such, any particular computational unit is more likely to retain useful frame data in its cache, which improves cache hit rates. Moreover, the improved cache hit rates overcome the slightly increased intra-frame stalls, improving the overall rendering time.

Additionally, the disclosed embodiments provide a system and method that dynamically adjusts the workload based on prospective rendering tasking. As such, the disclosed embodiments can reduce the performance impact of a rapidly moving camera eye by anticipating changes in the computational intensity of regions in the scene. Other technical advantages will be apparent to one of ordinary skill in the relevant arts.

Figure 6:
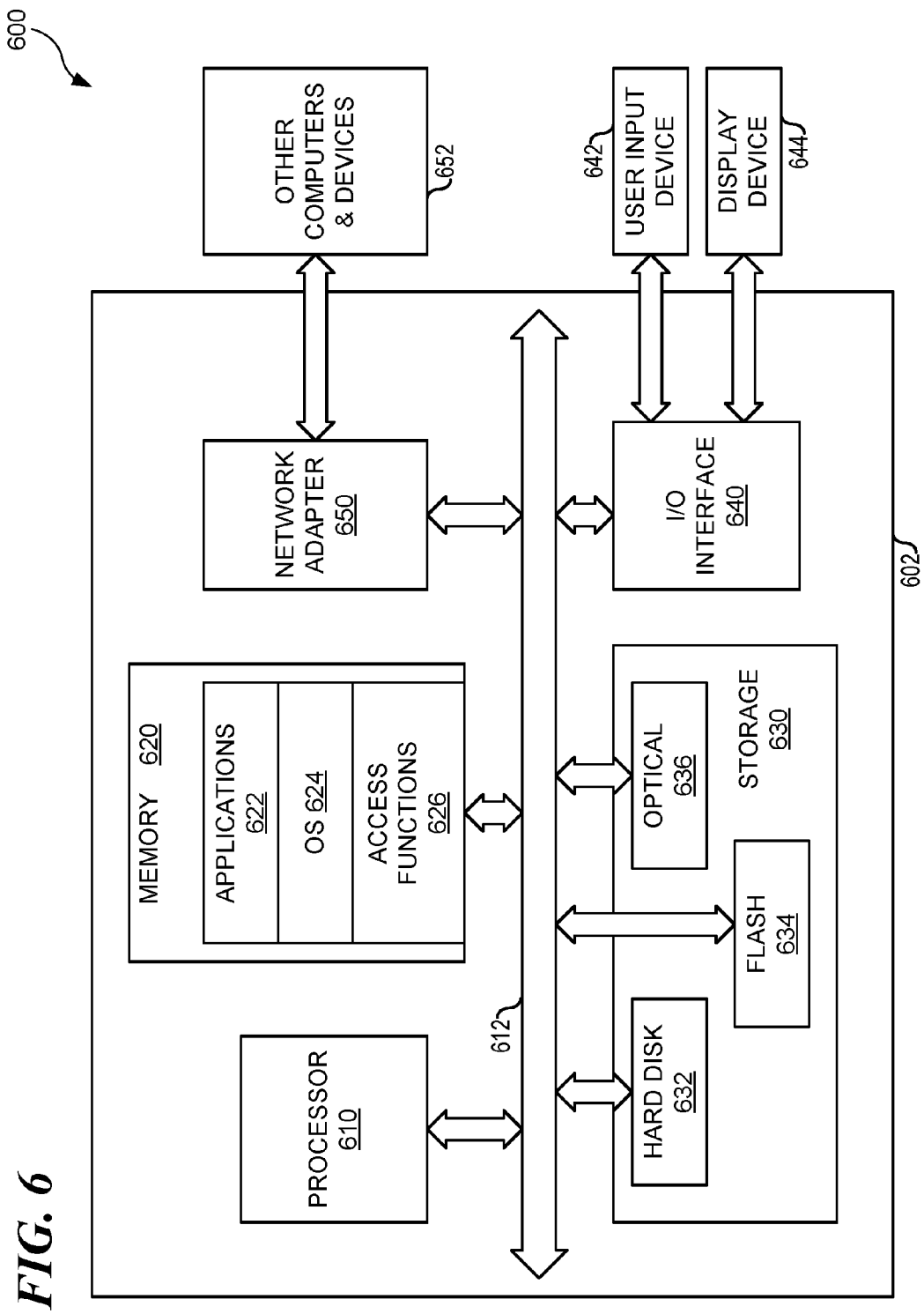
FIG. 6 illustrates a block diagram showing an exemplary computer system that can be configured to incorporate one or more preferred embodiments.

As described above, one or more embodiments described herein may be practiced or otherwise embodied in a computer system. Generally, the term "computer," as used herein, refers to any automated computing machinery. The term "computer" therefore includes not only general purpose computers such as laptops, personal computers, minicomputers, and mainframes, but also devices such as personal digital assistants (PDAs), network enabled handheld devices, internet or network enabled mobile telephones, and other suitable devices. FIG. 6 is a block diagram providing details illustrating an exemplary computer system employable to practice one or more of the embodiments described herein.

Specifically, FIG. 6 illustrates a computer system 600. Computer system 600 includes computer 602. Computer 602 is an otherwise conventional computer and includes at least one processor 610. Processor 610 is an otherwise conventional computer processor and can comprise a single-core, dual-core, central processing unit (PU), synergistic PU, attached PU, or other suitable processors.

Processor 610 couples to system bus 612. Bus 612 is an otherwise conventional system bus. As illustrated, the various components of computer 602 couple to bus 612. For example, computer 602 also includes memory 620, which couples to processor 610 through bus 612. Memory 620 is an otherwise conventional computer main memory, and can comprise, for example, random access memory (RAM). Generally, memory 620 stores applications 622, an operating system 624, and access functions 626.

Generally, applications 622 are otherwise conventional software program applications, and can comprise any number of typical programs, as well as computer programs incorporating one or more embodiments of the present invention. Operating system 624 is an otherwise conventional operating system, and can include, for example, Unix, AIX, Linux, Microsoft Windows™, MacOS™, and other suitable operating systems. Access functions 626 are otherwise conventional access functions, including networking functions, and can be include in operating system 624.

Computer 602 also includes storage 630. Generally, storage 630 is an otherwise conventional device and/or devices for storing data. As illustrated, storage 630 can comprise a hard disk 632, flash or other volatile memory 634, and/or optical storage devices 636. One skilled in the art will understand that other storage media can also be employed.

An I/O interface 640 also couples to bus 612. I/O interface 640 is an otherwise conventional interface. As illustrated, I/O interface 640 couples to devices external to computer 602. In particular, I/O interface 640 couples to user input device 642 and display device 644. Input device 642 is an otherwise conventional input device and can include, for example, mice, keyboards, numeric keypads, touch sensitive screens, microphones, webcams, and other suitable input devices. Display device 644 is an otherwise conventional display device and can include, for example, monitors, LCD displays, GUI screens, text screens, touch sensitive screens, Braille displays, and other suitable display devices.

A network adapter 650 also couples to bus 612. Network adapter 650 is an otherwise conventional network adapter, and can comprise, for example, a wireless, Ethernet, LAN, WAN, or other suitable adapter. As illustrated, network adapter 650 can couple computer 602 to other computers and devices 652. Other computers and devices 652 are otherwise conventional computers and devices typically employed in a networking environment. One skilled in the art will understand that there are many other networking configurations suitable for computer 602 and computer system 600.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A system, comprising:
a compute server having a plurality of processing elements (PEs), the compute server configured to:
receive a raw display band, the raw display band comprising scene model data and prospective rendering input based on received camera motion information;
partition the raw display band into a plurality of PE blocks based on a PE load balancing factor and the prospective rendering input;
distribute the plurality of PE blocks to the plurality of PEs;
render, by each PE, the PE blocks, to generate rendered PE blocks;
combine the rendered PE blocks to generate a processed display band;
determine a rendering time for each PE;
modify the PE load balancing factor based on the determined rendering times; and
transmit the processed display band to a graphics client.

2. The system of claim 1, wherein the compute server is configured to:
compress the processed display band; and
transmit the compressed processed display band to the graphics client.

3. The system of claim 1, wherein the compute server is configured to report a rendering time to the graphics client based on the determined rendering times.

4. The system of claim 1, wherein the compute server is configured to modify the PE load balancing factor based on the determined rendering times and received prospective rendering input.

* * * * *